Sept. 25, 1962  N. R. MORENO  3,055,666
GREASE SEAL RETAINER
Filed June 21, 1961  2 Sheets-Sheet 1
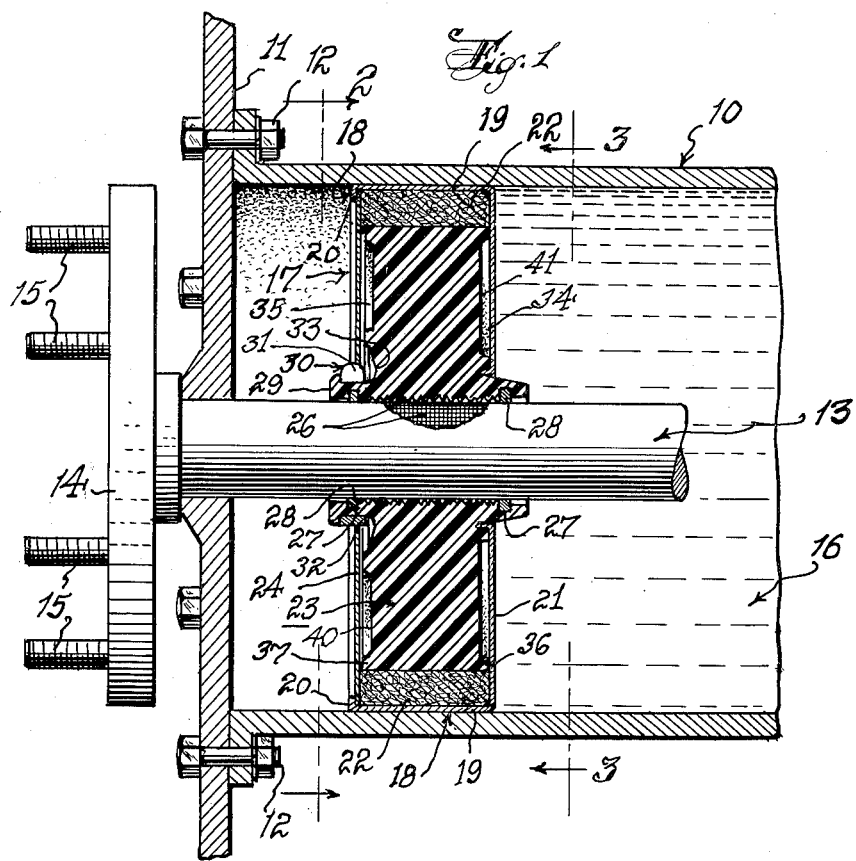
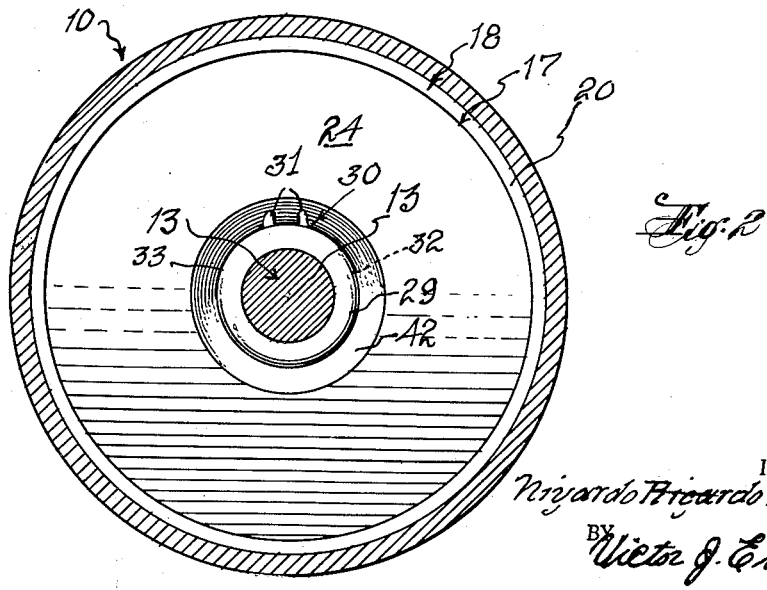
INVENTOR.
Nicardo Ricardo Moreno
BY Victor J. Evans & Co.
ATTORNEYS.

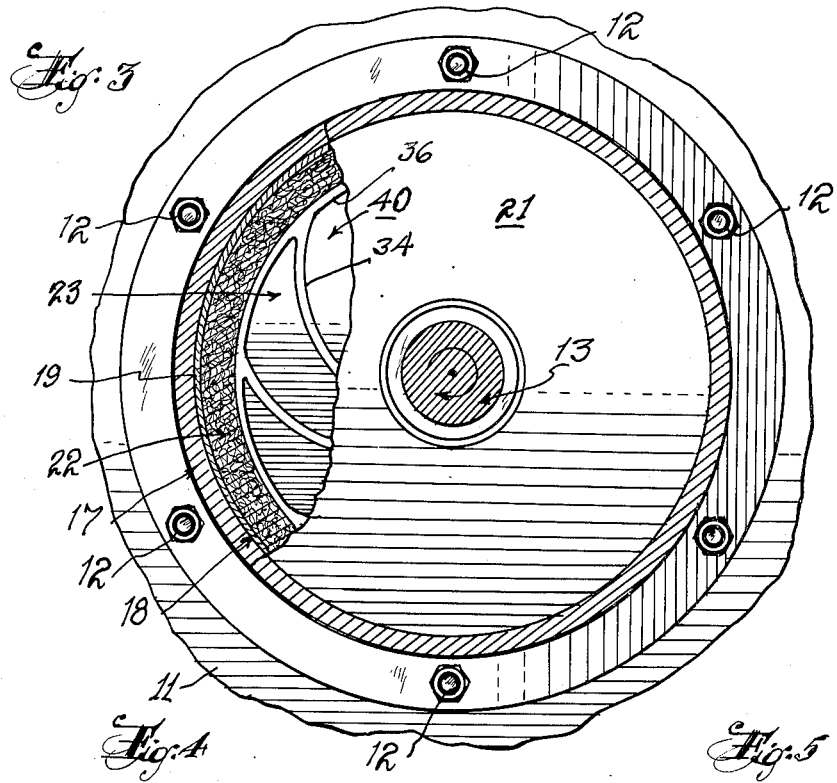
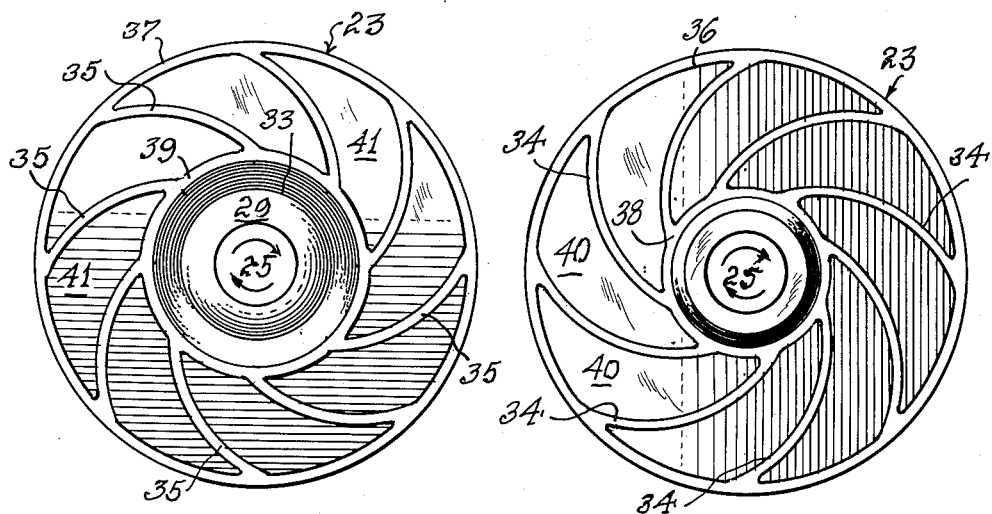

United States Patent Office 3,055,666
Patented Sept. 25, 1962

3,055,666
GREASE SEAL RETAINER
Nivardo Ricardo Moreno, 967 NW. 24th Ave.,
Miami, Fla.
Filed June 21, 1961, Ser. No. 118,607
2 Claims. (Cl. 277—25)

The present invention relates to a fluid seal, and more particularly to a retainer for preventing a lubricant such as grease or oil from entering a particular area or locality.

The primary object of the present invention is to provide a grease seal retainer which is adapted to be used in conjunction with a rotary member such as a vehicle axle, or a rotary shaft, and with the present invention in place, grease, oil or the like will be kept from a particular area, and for example grease or oil can be kept from a vehicle wheel so that the wheel brake mechanism will not be rendered inoperative or otherwise interfered with.

Still another object is to provide such a grease seal retainer that is constructed so that the oil or grease will be maintained in a position in order to accomplish the most advantageous lubrication of the desired rotating parts, and wherein in the event any of the lubricant enters a particular zone, the grease seal retainer of the present invention is constructed so that such lubricant will be automatically returned to its proper location or position.

A further object is to provide a grease seal retainer of the type stated that is rugged in structure and foolproof in use and which is economical to manufacture and efficient in operation.

These and other objects of the invention will become apparent from a reading of the following specification and claims, together with the accompanying drawings, wherein like parts are referred to and indicated by like reference characters and wherein:

FIGURE 1 is a fragmentary sectional view taken through the grease seal retainer of the present invention.

FIGURE 2 is a sectional view taken on the line 2—2 of FIGURE 1.

FIGURE 3 is a sectional view taken on the line 3—3 of FIGURE 1, and with parts broken away.

FIGURE 4 is a view looking at one side of the rotor.

FIGURE 5 is a view looking at the opposite side of the rotor.

Referring in detail to the drawings, the numeral 10 indicates a portion of a stationary housing or casing which has a cylindrical formation and the numeral 11 indicates a wall piece that is adapted to be affixed to an end of the housing 10 as for example by means of securing elements 12, FIGURE 1. Rotatably arranged in the housing 10 and extending through the wall piece 11 is a rotary shaft or axle 13, and the numeral 14 indicates a driven element which may be a wheel mounting member for a vehicle wheel, and the wheel may be attached to the mounting member 14 as for example by means of the usual studs 15. In FIGURE 1 the numeral 16 indicates the lubricant such as grease or oil which is arranged in the housing 10 for properly lubricating the rotating axle 13 in the housing 10.

According to the present invention there is provided a grease seal retainer which is indicated generally by the numeral 17, and as shown in the drawings the grease seal retainer 17 comprises a stationary support member which is indicated generally by the numeral 18, and the support member 18 has a generally circular or cylindrical formation and includes an outer circular rim 19 which is snugly positioned or seated within the housing 10. Formed integral with one side of the rim 19 or secured thereto is an inwardly directed circular flange 20, for a purpose to be later described, and formed integral with the opposite side of the rim 19 is a generally circular plate 21.

The numeral 22 indicates a circular band which is adapted to be made of a suitable yieldable material such as felt, and the band 22 is arranged in engagement with the inner surface of the rim 19.

The numeral 23 indicates a rotor which is adapted to turn or rotate within the felt band 22, and the rotor 23 can be made of a suitable material such as a suitable plastic. The rotor 23 is interposed between a circular plate 24 and the side wall 21, and the plate 24 is adapted to be held in position by having its outer periphery engage the inner surface of the flange 20.

There is provided in the central portion of the rotor 23 a central opening 25 through which extends the shaft or axle 13, and teeth or gripping surfaces 26 are arranged on the inner surface of the rotor 23 contiguous to the opening 25 so that the teeth 26 are adapted to engage the rotary shaft whereby the rotor 23 will be firmly fixed on the shaft 13 so that the shaft 13 and rotor 23 will rotate in unison.

There is provided in the inner portion of the rotor 23, spaced apart annular grooves 27, and ring members 28 are received in the grooves 27 so as to help provide a fluid tight seal at these points.

The rotor 23 is further provided with a cylindrical portion 29 that defines a hub, and the hub 29 is provided with an annular recess 33 whereby a clamp 30 can be arranged in engagement with the recess 33 for helping to clamp the rotor on the shaft. The clamp 30 is of the type that includes a generally circular portion 32 as well as spaced apart finger engaging lugs 31 which are arranged contiguous to a split in the ring like clamp 30 in order to insure that the lugs 31 can provide a means for facilitating the removal or replacement of the clamp on the recess of the hub 29.

One side of the rotor 23 is provided with a plurality of arcuate ribs 34, while formed integral with or secured to the other side of the rotor 23 is a plurality of generally similar ribs 35, and the ribs 35 are oriented in an opposite direction of the ribs 34, as shown in FIGURES 4 and 5.

There is provided on one side of the rotor 23 adjacent the outer periphery thereof a circular shoulder 36, and a similar circular shoulder 37 is arranged or provided on the opposite side of the rotor 23 adjacent the outer periphery thereof. The numeral 38 indicates a circular ridge on one side of the rotor 23, and the other side of the rotor is provided with a generally circular projection 39. As shown in the drawings there is defined or provided on one side of the rotor 23, a plurality of channels or passageways 40 which are defined between the ribs 34, and the opposite side of the rotor has channels or spaces 41 that are defined between the ribs 35.

It will be seen that according to the present invention there has been provided a grease seal retainer, and in use with the parts arranged as shown in the drawings, the shaft or axle 13 can be rotated by any suitable power source, and the rotating shaft 13 can be used for driving a member such as the mounting member 14 which is adapted to have a vehicle wheel attached thereto as for example by means of the usual studs 15. While the present invention has been described specifically for use in connection with a vehicle wheel, it is to be understood that the grease seal retainer of the present invention can be used in other applications so that its use is not limited to use with a vehicle axle or wheel construction.

It is to be noted that the present invention will help prevent grease or oil such as the lubricant 16 from moving beyond a certain area so that for example such lubricant can be kept from a vehicle wheel whereby the normal use of the vehicle brakes will not be interfered with as for example as occurs when the brake linings or other parts become saturated with leaking oil or lubrication.

With the parts arranged as shown, as the axle or shaft 13 turns, the rotor 23 likewise turns since the rotor 23 is firmly affixed to the shaft 13 due to the provision of the gripping surfaces or teeth 26 on the inner central portions of the rotor. The rotor 23 is adapted to turn within the stationary felt band or ring 22, and the felt band 22 is mounted in the stationary support member 18, as shown in the drawings. The end walls 21, being integral with the rim 19, is likewise stationary, and the plate 24 is also stationary so that the rotor 23 will rotate between the end wall 21 and the plate 24.

There is provided on one face or side of the rotor 23 a plurality of arcuate generally radially disposed ribs 34, FIGURES 3 and 5, and the opposite face or side of the rotor 23 is provided with ribs 35 which are directed or oriented in an opposite direction from the ribs 34. This construction together with the provision of the shoulders 36 and 37, and ridge 38 and projection 39 is such that lubricant will have a tendency to remain in the proper location due to centrifugal force. Thus, the ribs 34 are oriented or arranged in such a direction or fashion so that the lubrication will be circulated in a desired direction, and in the event that any lubrication leaks past the retainer, the arrangement of the ribs 35 is such that this leaking lubrication will have a tendency to be returned to its proper location such as to the right of the retainer 17, as shown in FIGURE 1.

The parts can be made of any suitable material and in different shapes and sizes.

It is to be noted that with the present invention the axle rotates through the retainer and independently thereof, and the present invention includes the spring clip 30 which helps hold the parts in proper position, and this clip 30 is of the removable type, so that for example when the parts are to be removed and replaced the spring clip can be disengaged.

The rotor 23 may be made of a suitable material such as plastic, rubber or the like, and the clip or clamp 30 may be made of a suitable metal or other material. The rotor turns within the support member 18.

The present invention can be used on any axle or shaft, and the rotor is adapted to be made of a material which is not affected by grease or oil. The clip or clamp 30 clampingly engages the hub 29 so as to help hold the rotor in place on the axle. In the event that any lubricant leaks through the device, centrifugal force in conjunction with the oppositely disposed ribs on opposite faces of the rotor will help return the lubricant to its proper location. The roughened surface 26 serves to insure that the rotor will not slip on the axle 13.

Heretofore grease retainers have been made wherein the retainers are stationary and the axle rotates within the retainer, but with the present invention the rotor turns wtih the axle so that a more efficient action will be accomplished.

The width of the rotor at the point 39 is greater than the width of the rotor at the point 36 and 37, so that when the parts are in the properly assembled position, sufficient pressure will be exerted to help prevent the grease from getting inside the device. The steel clip 30 helps seal and hold steady the part of the retainer on which it is mounted, and this clip rotates with the axle and rotor. The rings 28 help prevent oil or grease from contacting the surface 26 so that there will be no interference from the holding action of the surface 26 on the axle 13.

The plate 24 has a different size from the end wall 21 so that there is provided in the inner central portion of the plate 24 a space or opening 42 which provides clearance in order to permit the clip 30 to be readily removed or replaced as desired. Due to the action of centrifugal force, the grease will be thrown or urged outwardly in order to keep the grease from certain localities or areas, and the retainer is self-lubricating.

The rotor 23 is of one piece construction. The purpose of the spaces 40 and 41 is to permit the oil or grease to be expelled out, and the parts indicated by the numerals 36, 37, 38 and 39 represent the edge portions of the rotor. The edge portions or parts 36, 37, 38 and 39 serve to help reduce friction between the rotor and the walls of the support. The edges 36, 37, 38 and 39 and the ribs 34 and 35 together with the spaces 40 and 41 are all part of the same rotor 23 and are of the same material.

Although the invention herein described is fully capable of achieving the objects and providing the advantages hereinbefore mentioned, it is to be understood that it is merely illustrative of the presently preferred embodiment of the invention and that it is not to be limited to the details of construction herein described, other than as defined in the appended claims.

What is claimed is:

1. In a device of the character described, a cylindrical housing, a wall piece affixed to an end of said housing, a rotary shaft extending centrally through said housing and through said wall piece and said shaft having a driven element on an end thereof, a grease seal retainer comprising a stationary support member mounted in said housing, and said support member including a circular outer rim having an inwardly directed circular flange on one side thereof, a circular plate engaging said flange, a side wall integral with the other side of said rim and said side wall being arranged in spaced parallel relation with respect to said plate, a yieldable circular band arranged within said support member contiguous to the inner surface of said rim, a circular rotor rotatably arranged in said support member and said rotor being interposed between said plate and end wall, and said rotor having its outer periphery engaging the inner portion of said band, there being a central opening in said rotor for the projection therethrough of said shaft, gripping surfaces on said rotor for fixedly gripping said shaft, there being spaced apart grooves in the inner portion of said rotor, and sealing rings engaging said grooves and mounted on said shaft, said rotor including a cylindrical portion defining a hub, there being an annular recess in said hub, and a clamp arranged in engagement with said recess, the opposite sides of said rotor being provided with arcuate ribs, and the ribs on one side being oriented in an opposite direction from the ribs on the other side.

2. In a device of the character described, a cylindrical housing, a wall piece affixed to an end of said housing, a rotary shaft extending centrally through said housing and through said wall piece and said shaft having a driven element on an end thereof, a grease seal retainer comprising a stationary support member mounted in said housing, and said support member including a circular outer rim having an inwardly directed circular flange on one side thereof, a circular plate engaging said flange, a side wall integral with the other side of said rim and said side wall being arranged in spaced parallel relation with respect to said plate, a yieldable circular band arranged within said support member contiguous to the inner surface of said rim, a circular rotor rotatably arranged in said support member and said rotor being interposed between said plate and end wall, and said rotor having its outer periphery engaging the inner portion of said band, there being a central opening in said rotor for the projection therethrough of said shaft, gripping surfaces on said rotor for fixedly gripping said shaft, there being spaced apart grooves in the inner portion of said rotor, and sealing rings engaging said grooves and mounted on said shaft, said rotor including a crylindrical portion defining a hub, there being an annular recess in said hub, and a clamp arranged in engagement with said recess, the opposite sides of said rotor being provided with arcuate ribs, and the ribs on one side being oriented in an opposite direction from the ribs on the other side, there being circular shoulders defined on the outer side portions of said rotor, one of said sides of the rotor having a circular ridge, and the other side of the rotor having a circular projection.

References Cited in the file of this patent

UNITED STATES PATENTS

| | | |
|---|---|---|
| 1,849,359 | Braden | Mar. 15, 1932 |
| 2,322,867 | Meyer | June 29, 1943 |
| 2,561,694 | Gilbert | July 24, 1951 |
| 2,831,713 | Smith | Apr. 22, 1958 |

FOREIGN PATENTS

| | | |
|---|---|---|
| 618,347 | Great Britain | Feb. 21, 1949 |